March 7, 1950  E. G. NUTTING, JR., ET AL  2,500,042
SOLUTION STRENGTH CONTROL DEVICE
Filed May 1, 1947  3 Sheets-Sheet 3
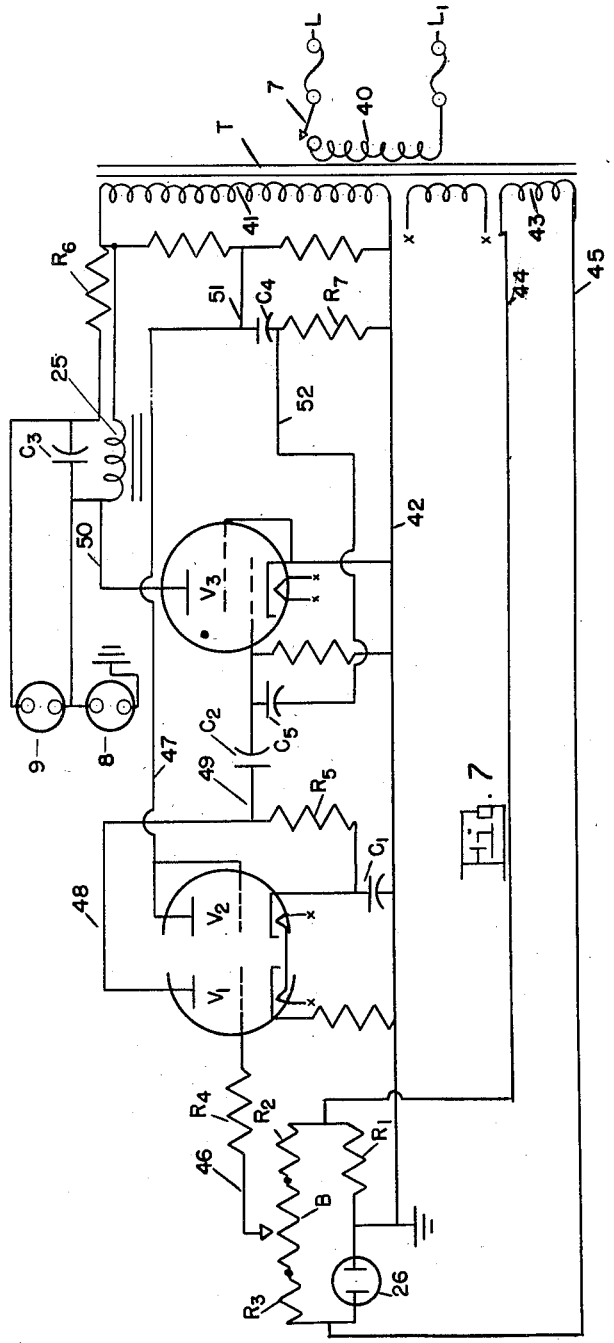
INVENTORS.
Eugene .G. Nutting Jr & Donald. M. Peppard
BY William R. Day
ATTORNEY Patented Mar. 7, 1950

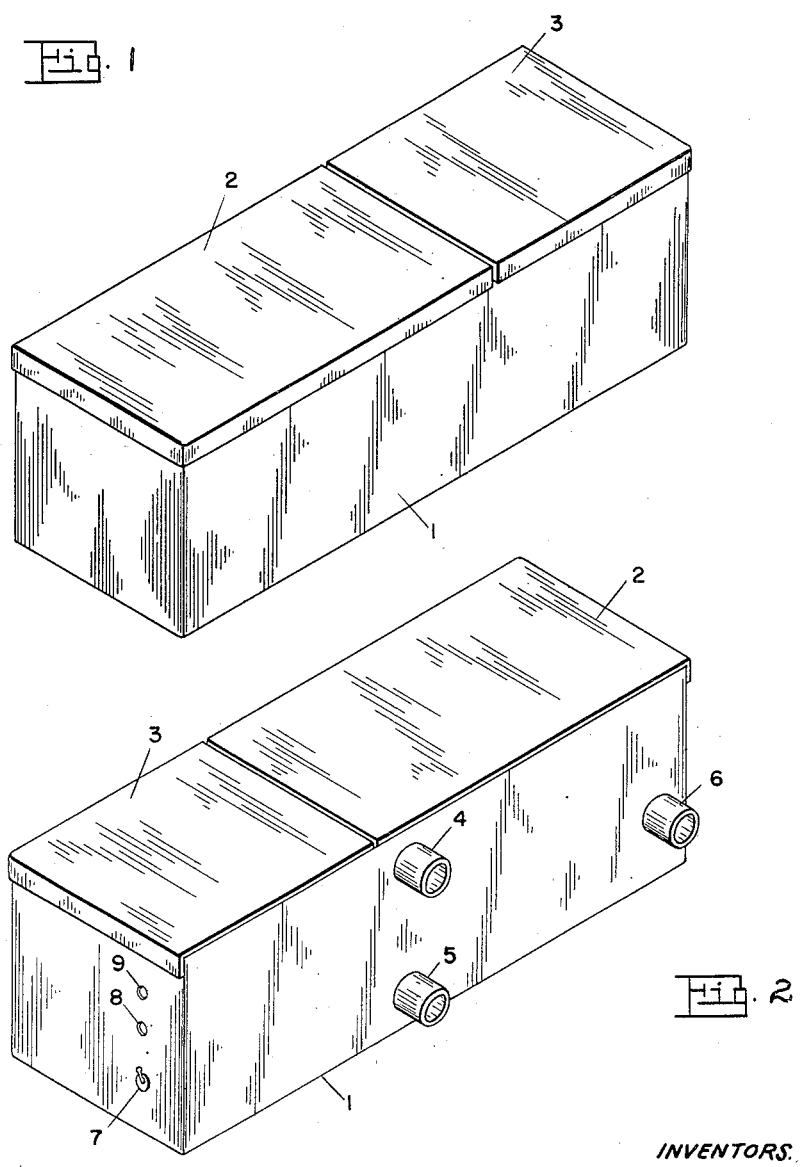

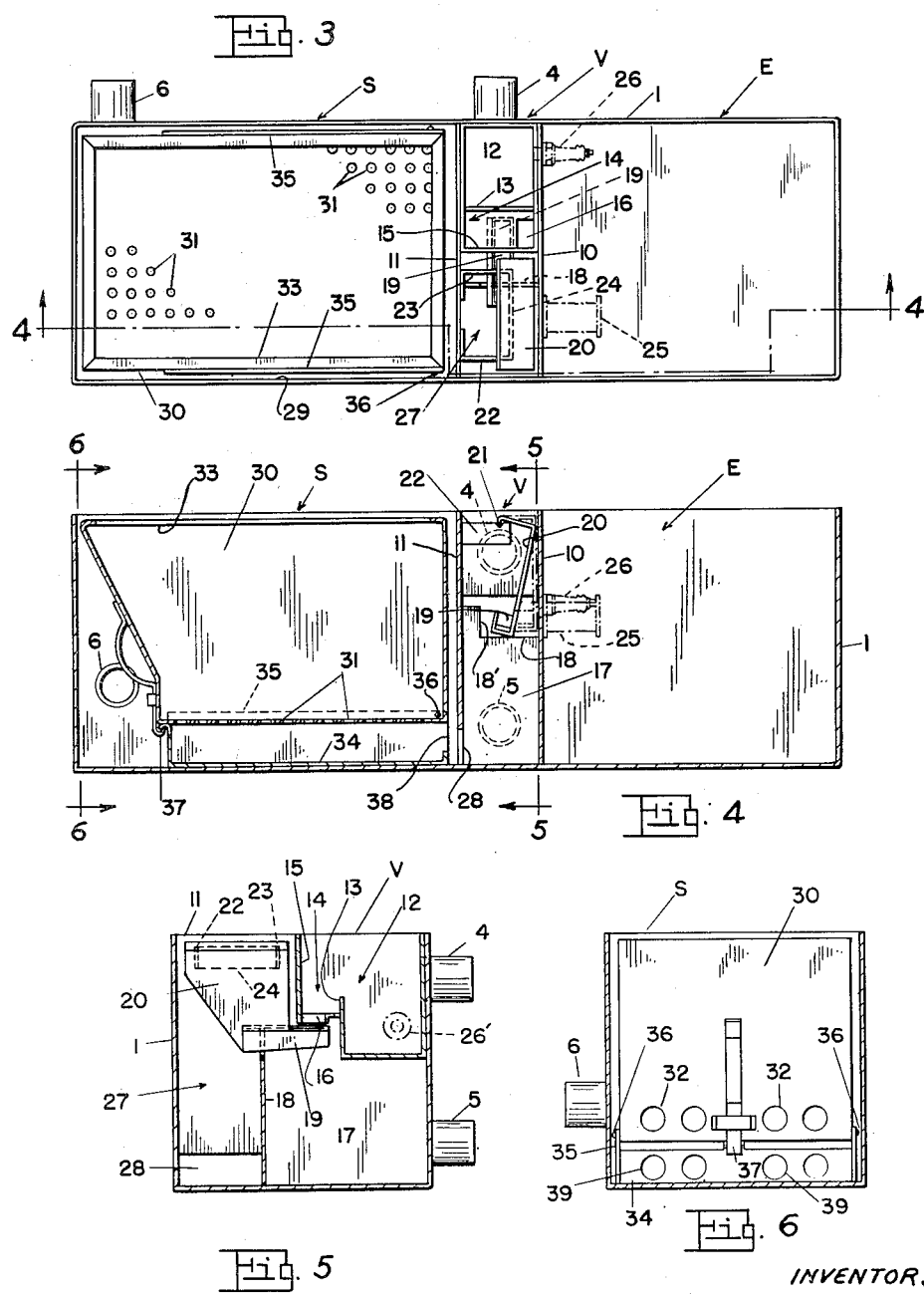

2,500,042

UNITED STATES PATENT OFFICE 2,500,042

SOLUTION STRENGTH CONTROL DEVICE

Eugene G. Nutting, Jr., and Donald M. Peppard, Wyandotte, Mich., assignors to Wyandotte Chemicals Corporation, Wyandotte, Mich., a corporation of Michigan Application May 1, 1947, Serial No. 745,318

12 Claims. (Cl. 23—253)

The present invention, relating as indicated to a chemical solution strength control device, has particular reference to a device for automatically maintaining the desired concentration of an electrically conductive chemical compound in an aqueous solution. It is well known that the electrical conductivity of aqueous solutions of chemical compounds, especially those of alkalies and alkaline salts, increases in proportion to the concentration. Heretofore many efforts have been expended toward utilizing this principle to control or maintain the concentration of a chemical solution in desired ranges. This problem has been particularly emphasized in the field of controlling the concentration of alkaline detergent solutions in dishwashing machines. Our invention is especially suitable for use in this latter field.

It is the general object and nature of our invention to provide a chemical solution strength control device which is in the form of a unitary element or single attachment which can conveniently be installed upon an apparatus through which a chemical solution is adapted to be circulated, such as for example, on a dishwashing machine. Such installation is accomplished, through the medium of our invention, for example, by simply connecting the device into the circulating solution line, connecting or "plugging in" to an electrical supply solution, and charging the solid chemical supply compartment of the device with the desired chemical compounds or salts which from time to time are to be added to the solution to maintain the predetermined concentration or strength.

In the addition of such chemical compounds as alkaline detergents to the circulating solution systems, considerable difficulty is encountered due to the formation of deposits, accumulation of sedimentation, recrystallization and the like, whereby the operation of moving parts is adversely affected.

One of the objects of our invention is to provide a flow control valve consisting of a single part and which has no close fitting or slideable elements either requiring lubrication, or are likely to be clogged or rendered ineffective by solid deposits. Briefly outlined, the flow directing valve embodied in the device of our invention is in the form of a pivotally mounted flume or channel which is actuated in one direction simply by the force of gravity and in the other direction by the attraction of a magnetic force from an electromagnet or solenoid.

A further object and advantage of our invention is the provision of a conductivity detecting cell, comprising spaced electrodes in contact with the chemical solution, so located that it is enclosed within the control device housing itself, is immersed in a constant volume of solution, and is well protected from the effects of extraneous influencing factors which would otherwise be present were such cell placed in the main body of the solution, such as in the washing solution tank of a dishwashing machine.

Another object of our invention is to provide a removable container or basket for receiving the solid chemical compound which is to be dissolved into the working solution. This removable basket has a sub-compartment, or false bottom, which operates as a collection trap for any sedimentation that does tend to accumulate from the solid chemical dissolution operation. This false bottom is easily moved away from the bottom of the solid chemical supply basket, for purposes of enabling convenient cleaning from time to time.

Our invention also includes the incorporation of an electronic actuating circuit for checking the operation of the flow directing valve (and correspondingly the dissolution of added amounts of solid chemical) which circuit is extremely sensitive and accurate, and wherein provision has been made for preventing any current or voltage fluctuations which might cause a chattering action of the valve actuating solenoid. This electronic circuit possesses the additional advantage in that mechanically movable and functioning parts, such as relays, have been eliminated.

Additional objects and advantages of our invention shall become apparent as the following description proceeds.

To the accomplishment of the foregoing and related ends and to enable any person skilled in the art readily to understand and practice the invention, the following full and concise description and annexed drawing set forth the best mode in which we have contemplated applying the principle thereof.

In said annexed drawing Fig. 1 is a perspective view taken from the front side, of the control device of our invention;

Fig. 2 is a perspective view taken from the back or opposite side to that of Fig. 1;

Fig. 3 is an elevational view looking down into the top of the device of our invention, and with the covers removed;

Fig. 4 is a sectional view taken substantially along line 4, 4 of Fig. 3 and in the direction of the arrows.

Fig. 5 is a sectional view taken substantially along line 5, 5 of Fig. 4 and in the direction of the arrows.

Fig. 6 is a sectional view taken substantially along line 6, 6 of Fig. 4 and in the direction of the arrows.

Fig. 7 is a wiring diagram of the electronic circuit incorporated in the device of our invention.

Now referring more particularly to the drawing, there is shown therein a rectangular housing 1 having the top cover members 2 and 3. The cover 2 is hingedly mounted on the housing 1 and the cover 3 is preferably permanently fixed or sealed in a closed position.

An inlet connection 4 is provided on the back wall of the housing 1, together with the two outlet connections 5 and 6. When the control device of our invention is applied to a dishwashing machine, the inlet 4 is suitably connected to the outlet side of the circulating pump, and the outlets 5 and 6 are connected to the washing solution tank. The inlet 4 may alternatively be connected to a collecting trough (not shown) within the spray tank of the washing machine, with the outlets 5 and 6 directly connected back into such spray tank and at a lower level, so that circulation into and out of these inlets and outlets is by gravity.

An electric "on-and-off" switch 7, together with the pilot lights 8 and 9, are located in one end of the housing 1.

Next directing attention particularly to Figs. 3 to 6, it will be seen that the interior of the housing is divided into three compartments, by means of the vertical, common dividing walls 10 and 11. These three compartments are generally designated as S, the stock supply and dissolving compartment; V, the flow directing compartment; and E, the electronic actuating compartment.

The inlet connection 4 leads into the chamber 12 formed by the walls 10 and 11 and the short baffle wall 13. The vertical wall 15 forms one end of an overflow compartment, indicated at 14, for solution which fills the compartment 12 and overflows over the top of the baffle wall 13. An opening 16 is provided in the bottom of the compartment 14 and communicates with the lower, return-flow compartment 17, from which the outlet connection 5 leads.

One end of the compartment 17 is formed by the vertical wall 18. Just above the top of the wall 18, and beneath the opening 16, there is located the movable flume or channel 19, which, as best will be seen from Fig. 5, has a slightly horizontally inclined bottom wall. The channel 19 has a vertical closed end at its upstream end and is open at its downstream end. The channel 19 is carried by a supporting arm or plate 20 which, as viewed from Fig. 4, is essentially in the form of an inverted L. The plate 20 has a rebent lip or end portion 21 which is adapted to fit into suitable notches in the parallel arms 22 and 23 of the bracket member 24 which is in turn fixed to the compartment wall 11.

By reference to Figs. 3 and 5 it will be seen that the end of the channel 19 is of sufficient length as to be co-extensive with the size of the opening 16. When the channel 19 and its supporting arm or plate 20 are in normal position, they occupy that position as shown by the solid lines in Fig. 4, due to the force of gravity, and because the pivot point, as indicated at 21, is laterally displaced from the vertical plane of the opening 16. It will be noted that a shoulder or projection 18' is provided upon the top of the wall 18 and serves as an abutment limiting the movement of the channel 19 in a left-hand direction (with respect to Fig. 4).

An electromagnet 25 is mounted on the wall 10, and on the side thereof forming the compartment E. When the magnet 25 is electrically actuated, the magnetic flux therefrom attracts the channel 19 and supporting plate 20 to move it into the position represented by the dot and dash lines in Fig. 4. The channel 19 and plate 20 thus operate as a movable armature of the magnet 25. When in such magnetically actuated position, the channel 19 is in vertical alignment under the opening 16.

A conductivity detecting cell having a pair of spaced electrodes, and suitably in the simple form of an internal combustion engine spark plug 26, is mounted through the wall 10, whereby its electrodes are contacted by the solution entering the compartment 12. The relative position or location of the detecting cell or spark plug 26 in the compartment 12 is indicated by the dot and dash lines 26' in Fig. 5.

A solution receiving compartment 27 is located beneath the downstream or discharge end of the channel 19. An opening 28 in the bottom of the wall 11 communicates from the compartment 27 to the solid chemical compounds supply and dissolving compartment S. In this latter compartment there is located the removable container or basket 30 having a perforated bottom, as indicated at 31. The removable container 30 also has the perforations 32 in its end wall. A marginal flange 33 is provided around the open top of the container 30, for the purpose of providing a convenient grip in lifting the latter out of the compartment S.

A false bottom in the form of a pan 34, having the side walls 35 extending slightly above the bottom of the container 30, is hingedly mounted to the latter at the points 36, 36. A flexible strip fastening device, comprising the hooked end 37, engages with the end of the pan 34, for releasably retaining the pan in its position on the bottom of the container 30, as shown in Figs. 4 and 6. An opening 38 is provided in the pan 34 opposite the inlet 28 to the compartment S. Openings 39 (Fig. 6) are provided in the opposite end of the pan 34.

The operation of the above described control device is as follows:

A quantity of solid chemical compound such as an alkaline detergent composition, is charged into the container 30. The inlet and outlet connections 4, 5 and 6 are connected as previously described. The switch 7 is turned to "on" position, which is indicated by the pilot light 8. Incoming solution enters the inlet 4, fills the compartment 12, overflows over the wall 13, down through the opening 16, into the chamber 17 and back through the outlet 5, where it is returned into the dishwashing machine. When the concentration of the chemical compound in the solution drops below a pre-determined minimum value, and correspondingly produces a decrease in the electrical conductivity of this solution; such change in conductivity, as detected across the electrodes of the cell 26, so actuates the electronic circuit (subsequently to be described) in the compartment E, as to in turn operate the electromagnet 25. Operation of the latter is indicated by the pilot light 9. The magnetic flux of the magnet 25 moves the channel 19 and plate 20 to the position shown in dot and dash lines in Fig. 4 whereupon solution going through the opening 16, is conducted over the top of the vertical wall 18 into the compartment 27, whence it flows through the opening 28 into the compartment S and through the openings 38 in the pan 34. The level of the solution then rises above the bottom of the compartment S through the perforations 31 and into the container 30 where a portion of the solid chemical compound is dissolved therein; thereby increasing the strength of the solution. When the solution in the compartment S reaches the level of the outlet 6, the strengthened solution from the container 30 then passes out, primarily through the openings 32 and 39, and is returned to the dishwashing machine. When the conductivity of the solution entering the chamber 12 is increased to its pre-determined value, the electronic circuit is then re-actuated so as to de-energize the magnet 25 and to permit the channel 19 and plate 20 to return to normal position under the influence of gravity, whereby the incoming solution from the inlet 4 is directed back out through the outlet 5 as first above described.

The detailed structure of the electronic actuating circuit is illustrated in Fig. 7. Electrical power from a conventional supply source (such as the customary 110 v., A. C. supply) is introduced through the lines L, L, through the switch 7 into the primary windings 40 of the transformer T. The secondary winding 41 of the transformer T is connected through the line 42 to one side of the Wheatstone bridge B. The secondary winding 43 of the transformer T is connected through the lines 44 and 45 in order to impose a fixed voltage upon, and to energize, the Wheatstone bridge B. The resistance $R_1$, and the cell 26 constitute two arms in one side of the Wheatstone bridge B, and the resistances $R_2$ and $R_3$ constitute the arms in the other side of the bridge. As suitably indicated, the bridge B has a variable adjustment, whereby the relation of the value of the current conducted through the cell 26 may be set at the desired amount. When the bridge B is in a state of unbalance, such as by a change in the conductivity through the cell 26, current passes through the line 46 and the smoothing resistance $R_4$ to the grid of the electronic vacuum tube or valve $V_1$. Tube $V_2$ with its grid tied to its plate acts as a half-wave rectifier for alternating current supplied from the line 47. It will be noted, that in Fig. 7 the tubes $V_1$ and $V_2$ are represented as being in the form of a "twin triode" vacuum tube. A 6SN7 type tube is suitably used for this purpose. The rectified or direct current from the tube $V_2$ through the resistance $R_5$ and line 48, is used to supply the plate of the tube $V_1$. The tube $V_1$ functions as a voltage amplifier for amplifying the electric signal impressed upon its grid. This amplified signal is then conducted through the line 49 and the coupling condenser $C_2$ to the grid of the gas-filled electronic tube $V_3$, the latter preferably being of the 2050 type, which is termed a "thyratron" and is capable of conducting a current on the order of 0.1 ampere.

Alternating current, derived from the secondary winding 41 of the transformer T through the electromagnet 25 and the line 50, is applied to the plate of the tube $V_3$. When the tube $V_3$ is in a conducting condition, it acts as a half-wave rectifier, rectifying only the positive half cycle of the alternating current impressed upon it.

A condenser $C_3$ is connected in parallel with the magnet 25 and supplies current to the latter during the negative half cycle when rectified current is not passing through the line 50. A protective resistor $R_6$ is placed in series with the condenser $C_3$ to prevent any high charging current surge passing through the tube $V_3$.

Condenser $C_4$ and resistor $R_7$ form a fixed phase shift bridge the signal from which is transmitted to the grid of the tube $V_3$ through lines 51, 52 and condenser $C_5$, thus ensuring that when conduction through tube $V_3$ takes place it will be for substantially all of the conducting half cycle of such tube.

Other modes of applying the principle of our invention, in addition to the one hereinabove described and illustrated in detail, may be employed, provided the structural elements stated by any of the following claims or the equivalent of such elements be utilized.

We, therefore, particularly point out and distinctly claim as our invention and discovery:

1. A chemical solution strength control device comprising a single housing member having three compartments therein: a first compartment containing electronic solution strength detecting and actuating apparatus, the second compartment containing a solution receiving chamber and flow directing valve, and the third compartment containing a solid chemical supply container, there being an electric actuation connection between said electronic apparatus and said valve, and a liquid flow connection between said second and third compartments, such liquid flow connection being adapted to receive liquid delivered from said valve.

2. A chemical solution strength control device comprising a single housing member having three compartments therein: a first compartment containing electronic solution strength detecting and actuating apparatus, the second compartment containing a solution receiving chamber and flow directing valve, a common wall for said first and second compartments, an electromagnet connected to said electronic apparatus and mounted on said common wall in said first compartment at a point in alignment with said flow directing valve, the latter constituting a movable armature attracted by the magnetic flux of said electromagnet, and the third compartment containing a solid chemical supply container, there being a liquid flow connection between said second and third compartments, such liquid flow connection being adapted to receive liquid delivered from said valve.

3. A chemical solution strength control device comprising a single housing member having three compartments therein: a first compartment containing electronic solution strength detecting and actuating apparatus, the second compartment containing a solution receiving chamber and flow directing valve controlled by said apparatus, a common wall for said first and second compartments, electrodes mounted in said common wall and being electrically connected to said electronic apparatus, said electrodes being in contact with the solution contained in said receiving chamber, and the third compartment containing a solid chemical supply container, there being a liquid flow connection between said second and third compartments, such liquid flow connection being adapted to receive liquid delivered from said valve.

4. A chemical solution strength control device comprising a single housing member having three compartments therein: a first compartment containing electronic solution strength detecting and actuating apparatus, the second compartment containing a solution receiving chamber and flow directing valve, a common wall for said first and second compartments, an electromagnet connected to said electronic apparatus and mounted on said common wall in said first compartment at a point in alignment with said flow directing valve, the latter constituting a movable armature attracted by the magnetic flux of said electromagnet, the third compartment containing a solid chemical supply container, there being a liquid flow connection between said second and third compartments, such liquid flow connection being adapted to receive liquid delivered from said valve, and electrodes mounted in said common wall and being electrically connected to said electronic apparatus, said electrodes being in contact with the solution contained in said receiving chamber.

5. A chemical solution strength control device comprising a single housing member having three compartments therein: a first compartment containing electronic solution strength detecting and actuating apparatus, the second compartment containing a solution receiving chamber and flow directing valve controlled by said apparatus, and the third compartment containing a solid chemical supply container, a common wall for said second and third compartments, said common wall having a bottom opening therein, a solution inlet and an outlet in the outer wall of said second compartment, said valve being adapted to direct solution flow alternatively to said bottom opening and to said outlet.

6. A chemical solution strength control device comprising a single housing member having three compartments therein: a first compartment containing electronic solution strength detecting and actuating apparatus, the second compartment containing a solution receiving chamber and flow directing valve, a common wall for said first and second compartments, an electromagnet connected to said electronic apparatus and mounted on said common wall in said first compartment at a point in alignment with said flow directing valve, the latter constituting a movable armature attracted by the magnetic flux of said electromagnet, and the third compartment containing a solid chemical supply container, a common wall for said second and third compartments, said common wall having a bottom opening therein, a solution inlet and an outlet in the outer wall of said second compartment, said valve being adapted to direct solution flow alternatively to said bottom opening and to said outlet.

7. A chemical solution strength control device comprising a single housing member having three compartments therein: a first compartment containing electronic solution strength detecting and actuating apparatus, the second compartment containing a solution receiving chamber and flow directing valve controlled by said apparatus, a common wall for said first and second compartments, electrodes mounted in said common wall and being electrically connected to said electronic apparatus, said electrodes being in contact with the solution contained in said receiving chamber, and the third compartment containing a solid chemical supply container, a common wall for said second and third compartments, said common wall having a bottom opening therein, a solution inlet and an outlet in the outer wall of said second compartment, said valve being adapted to direct solution flow alternatively to said bottom opening and to said outlet.

8. A chemical solution strength control device comprising a single housing member having three compartments therein: a first compartment containing electronic solution strength detecting and actuating apparatus, the second compartment containing a solution receiving chamber and flow directing valve, a common wall for said first and second compartments, an electromagnet connected to said electronic apparatus and mounted on said common wall in said first compartment at a point in alignment with said flow directing valve, the latter constituting a movable armature attracted by the magnetic flux of said electromagnet, the third compartment containing a solid chemical supply container, and electrodes mounted in said common wall and being electrically connected to said electronic apparatus, said electrodes being in contact with the solution contained in said receiving chamber, and a common wall for said second and third compartments, said common wall having a bottom opening therein, a solution inlet and an outlet in the outer wall of said second compartment, said valve being adapted to direct solution flow alternatively to said bottom opening and to said outlet.

9. In a chemical solution strength control device, a chamber for receiving the chemical solution, a vertical wall located beneath said chamber, said chamber having a bottom opening located at a point horizontally displaced from one side of said wall, and a movable channel member mounted between the top of said wall and said bottom opening, said channel member extending horizontally from a point in alignment with said bottom opening to a point beyond the opposite side of said wall.

10. In a chemical solution strength control device, a chamber for receiving the chemical solution, a vertical wall located beneath said chamber, said chamber having a bottom opening located at a point horizontally displaced from one side of said wall, a channel member located above said vertical wall and below said bottom opening, said channel member extending horizontally from a point in alignment with said bottom opening to a point beyond the opposite side of said wall, a supporting arm pivotally supporting said channel member, the pivot point of said supporting arm being horizontally displaced from said bottom opening, an electromagnet mounted adjacent said channel member for movably attracting the latter, whereby said channel member moves into and out of registry with said bottom opening in one direction under the force of gravity and in the other direction under the magnetic force of said electromagnet.

11. In a chemical solution strength control device a housing having a compartment through which the solution is to be circulated, a perforated, solid chemical container removably fitting in said compartment, and a pan hingedly mounted on the bottom of said container, said compartment having an inlet opening at a point in horizontal alignment with said pan and an outlet opening at a point above the top of said pan.

12. In a chemical solution strength control device, a flow directing valve in the form of a pivotally movable channel, electrodes adapted to be contacted with the solution, an electromagnet mounted adjacent said valve and adapted to move the latter under the influence of its magnetic flux, and an electronic circuit comprising a Wheatstone bridge in which said electrodes are connected as one arm, an electronic amplifying tube connected to said Wheatstone bridge for amplifying the voltage therefrom, and an alternating current rectifying electronic tube connecting the output of said amplifying tube to said electromagnet.

EUGENE G. NUTTING, JR.
DONALD M. PEPPARD.

No references cited.